No. 855,927. PATENTED JUNE 4, 1907.
E. BOSSHARDT.
SMELTING FURNACE.
APPLICATION FILED MAY 21, 1906.

2 SHEETS—SHEET 1.

WITNESSES:
Jas K McCathran
John B Siggers

INVENTOR,
Edwin Bosshardt.
by
ATTORNEY.

No. 855,927. PATENTED JUNE 4, 1907.
E. BOSSHARDT.
SMELTING FURNACE.
APPLICATION FILED MAY 21, 1906.

2 SHEETS—SHEET 2.

WITNESSES:
Jas. K. McCathran
J. Rob. Liggers

INVENTOR,
Edwin Bosshardt.
by
ATTORNEY.

UNITED STATES PATENT OFFICE.

EDWIN BOSSHARDT, OF COLOGNE, GERMANY, ASSIGNOR OF ONE-HALF TO HENRY GARDA, OF LEIPZIG, GERMANY.

SMELTING-FURNACE.

No. 855,927.　　　Specification of Letters Patent.　　　Patented June 4, 1907.

Application filed May 21, 1906. Serial No. 317,960.

*To all whom it may concern:*

Be it known that I, EDWIN BOSSHARDT, a citizen of the Swiss Republic, residing at 4 Eifel Platz, Cologne, in the Empire of Germany, have invented certain new and useful Improvements in Smelting-Furnaces, of which the following is a specification.

This invention relates to open hearth furnaces for smelting bronze, tombac, steel and iron in large quantities.

The object of the present invention is to provide a form of open hearth furnace which, unlike the Siemens-Martin furnace may work continuously, and more effectively, the smelting only occupying a few hours, and to provide a furnace which may with advantage be used in small foundries.

According to the present invention air is passed through chambers beneath or adjacent the hearth and after being partly heated therein is highly-heated by being led through a furnace or furnaces, the highly heated air together with the products of combustion from the furnace or furnaces being led over the reverberatory hearth.

The whole furnace is arranged so that it can be tilted to enable the molten metal to be poured off, which method is preferred to emptying through floss holes. The hearth is comparatively shallow so as to present a large surface to the hot gases flowing over it thereby insuring a better absorption of the same.

The accompanying drawings diagrammatically illustrate a tilting furnace according to the invention.

Figure 1:
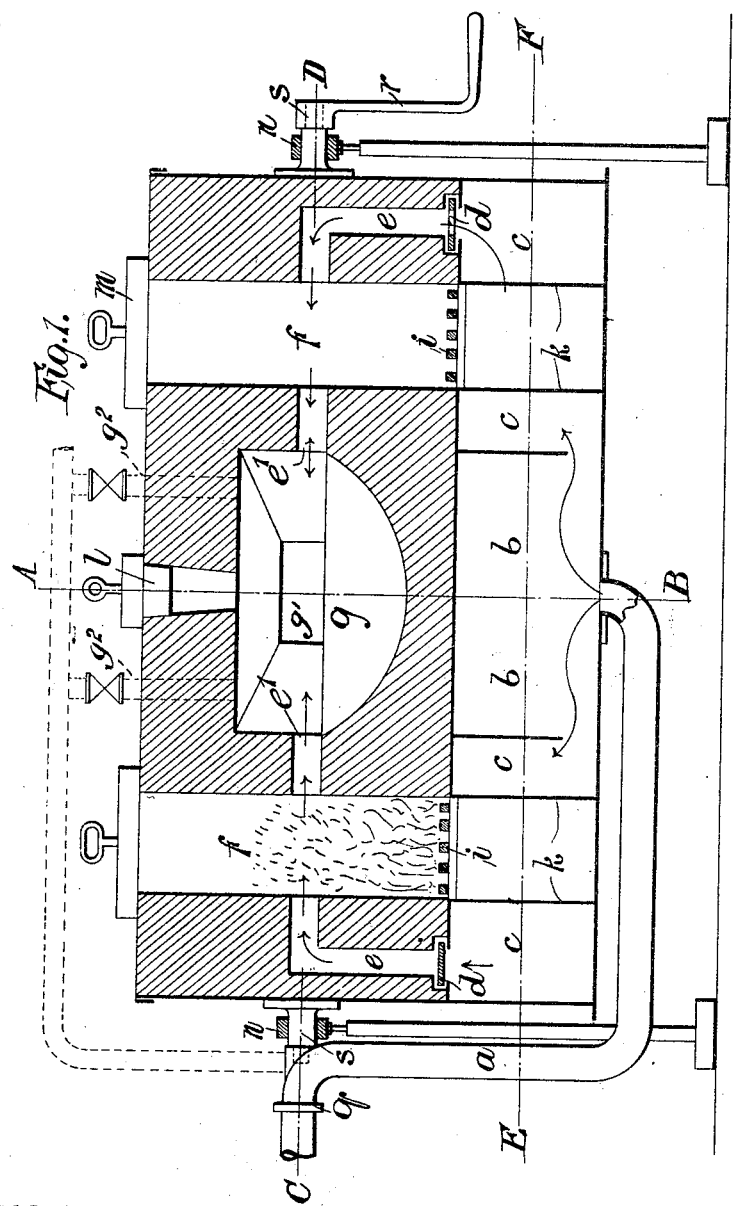
Figure 2:
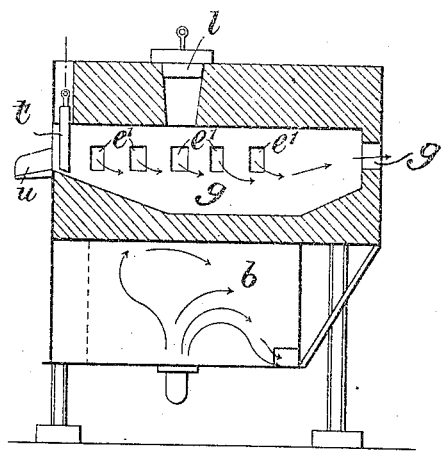
Figure 3:
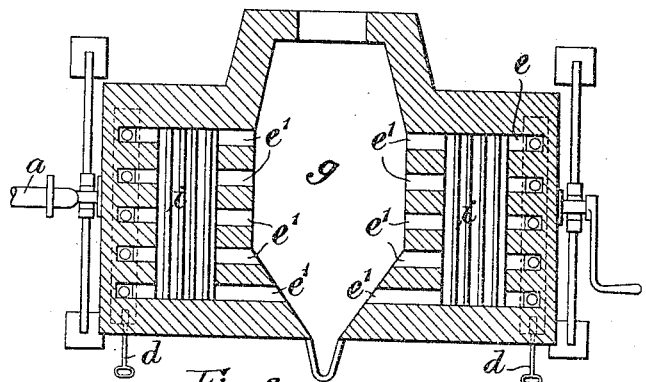
Figure 4:
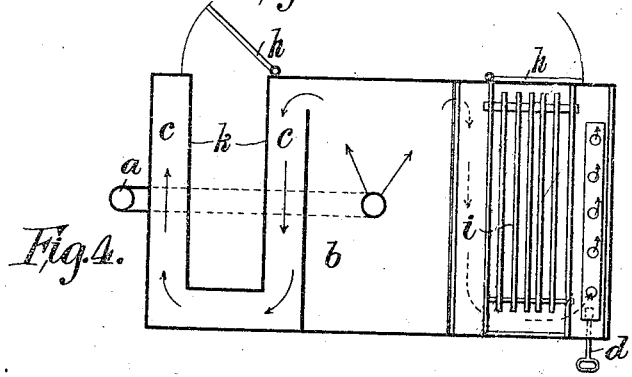

Figure 1 is a front sectional elevation on a larger scale than the remaining figures. Fig. 2 is a side sectional elevation on A, B, Fig. 1. Fig. 3 is a sectional plan on C, D, Fig. 1. Fig. 4 is a sectional plan on E, F, Fig. 1.

In the furnace illustrated the air flows from a pipe $a$ into a central chamber $b$ beneath the hearth $g$, passing thence through heating chambers $c$, $c$, surrounding three sides $k$, $k$, of each of the ash-pits of furnaces $f$. From the chambers $c$, $c$, the heated air flows past valves $d$ and through distributing passages $e$ into the incandescent zones of furnaces $f$. The air so highly heated passes together with products of combustion into the hearth $g$, finally escaping through a flue $g'$, to the chimney. Fig. 4 shows the course of the air and the relative positions of the heating chambers.

The ash-pits below the grates $i$, $i$, are inclosed on three sides by the walls $k$, $k$, which are heated by the fires and thereby heat the air passing in contact with them. The fourth side of each ashpit is closed by a door $h$.

If after charging the hearth $g$ it is necessary to start the furnace the valves $d$, $d$ are closed and the fires on the grates $i$, $i$ are started by the natural draft of the chimney. When the side furnaces are incandescent the doors $h$ and covers $m$ are closed the valves $d$ opened and the blast introduced through the pipe $a$.

If the highly heated air is too thin, that is, is too poor in oxygen, air may be led by by-pass passages $g^2$ from the chambers $c$ to the furnace, for instance, as indicated in dotted lines at the left hand side of Fig. 1.

In order that the hearth which has an imperforate bottom, may be discharged without cutting off the blast, the furnace is incased in a metal shell and mounted on trunnions $s$, $s$, in bearings, $n$, $n$, the pipe $a$, to which one trunnion is connected at $q$, working in a suitable joint. The opposite trunnion is fitted with a handle or crank $r$.

When the hearth is tilted, the valve $t$ is opened and the metal flowing over the spout $u$ is prevented from chilling by the hot gases which escape with it.

If necessary, a blast may be introduced below the grates $i$, $i$, through closable openings in the walls $k$, $k$ of the ashpits, the doors $h$ in this case being closed.

Having thus described my invention, what I claim as new and desire to secure by Letters Patent is:—

1. In combination, a smelting hearth, a furnace on each side of and communicating with said hearth, a central chamber beneath the hearth, other chambers connected therewith and surrounding the ash-pits of the furnaces, the latter chambers being in communication with the furnaces above the grates for the purpose of conducting the heated air thereto and thence to the hearth.

2. In combination, a smelting hearth, a furnace on each side of and communicating with said hearth, air chambers beneath the hearth and surrounding the ash-pits of the furnaces, main distributing conduits from said chambers to the furnaces above the grates, and by-pass passages from the chambers to the hearth.

3. The combination of a hearth, a furnace on each side of and communicating with the said hearth, air chambers beneath the hearth and surrounding the ash-pits of the furnaces, passages from the said chambers to the furnace, and a metallic shell incasing the whole structure and mounted on trunnions to enable the hearth to be tilted and discharged.

4. The combination of a smelting hearth having a charging opening at the top and an outlet at one side, furnaces at each side of the hearth, a casing for holding the hearth and furnaces in an organized structure so as to cause them to move together, supports forming bearings, and pivots mounted in the bearings and carried by the casing, whereby the hearth may be tilted and discharged.

In testimony whereof I have signed my name to this specification in the presence of two subscribing witnesses.

EDWIN BOSSHARDT.

Witnesses:
ALBERT E. PARKER.
J. PLANTS.